United States Patent [19]

Burchell

[11] 4,241,468

[45] Dec. 30, 1980

[54] ADJUSTABLE SHANK SLOT DIAL

[75] Inventor: Stanley C. Burchell, Barrington, Ill.

[73] Assignee: Allstar Fasteners, Inc., Elk Grove Village, Ill.

[21] Appl. No.: 972,697

[22] Filed: Dec. 26, 1978

[51] Int. Cl.$^3$ .................... B23G 9/00; B23G 11/00
[52] U.S. Cl. ............................... 10/169; 10/2; 10/20.5
[58] Field of Search ............ 10/4, 6, 9, 20.5, 21, 10/31, 39, 52, 59, 60, 69, 165, 169, 2; 29/35.5, 38 C; 408/71; 409/161, 173, 198, 221

[56] References Cited

U.S. PATENT DOCUMENTS

| | | | |
|---|---|---|---|
| 1,448,832 | 3/1923 | DeFries | 10/4 X |
| 1,872,564 | 8/1932 | Stimpson | 10/20.5 |
| 1,999,264 | 4/1935 | Tilton | 10/4 |
| 2,398,230 | 4/1946 | Keller | 408/71 X |
| 2,674,754 | 4/1954 | Hale | 10/20.5 |
| 2,993,218 | 7/1961 | Devlin | 10/169 X |
| 3,085,264 | 4/1963 | Stern | 10/20.5 X |
| 3,210,786 | 10/1965 | Moeltzner | 10/21 |
| 3,277,684 | 10/1966 | Gareri | 10/4 X |
| 3,435,472 | 4/1969 | Haines | 10/21 |
| 3,758,900 | 9/1973 | Morton | 10/4 |
| 3,786,527 | 1/1974 | Morton et al. | 10/169 |
| 4,001,906 | 1/1977 | Betz | 10/20.5 X |

Primary Examiner—Ervin M. Combs
Attorney, Agent, or Firm—Charles F. Pigott, Jr.

[57] ABSTRACT

The disclosed shank slot dial has two equi-diameter cylindrical members each having a like plurality of axial notches equally spaced around the circumferential surface of the member. Mating helical thread means formed on the members concentrically of the notched surfaces allow for relative rotation of the members, which adjustably varies the axial spacing between the surfaces for proper support of the shanks to be fixtured in the dial. Keying means in the form of an axial grove on one member and a radially movable set screw on the other member nonrotatably hold the members at selected axial spacings and with the notches longitudinally aligned. The shank components supported in the dial thereby are abutted only at their end sections in corresponding aligned pairs of notches and bridge across at their intermediate sections the spacing between the notched surfaces.

7 Claims, 5 Drawing Figures

U.S. Patent  Dec. 30, 1980  4,241,468
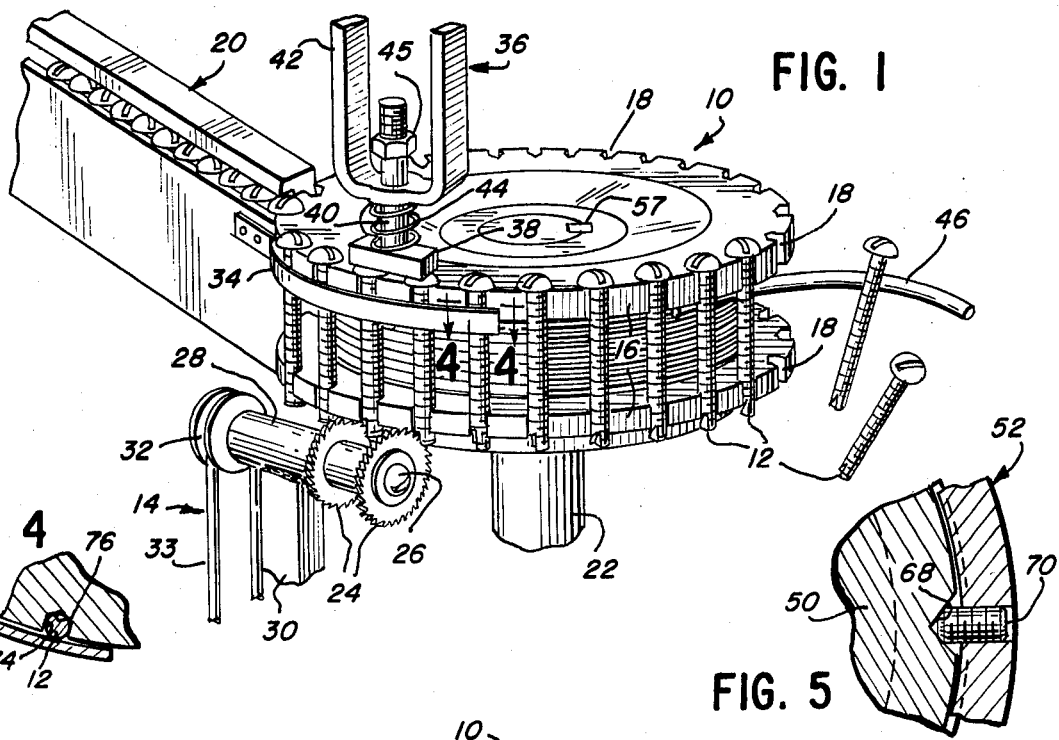
FIG. 1
FIG. 4
FIG. 5
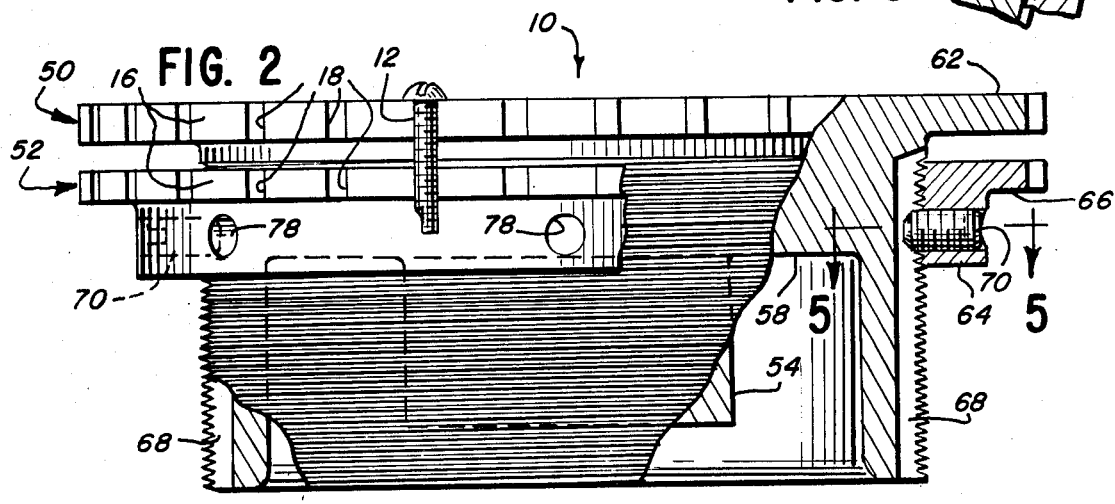
FIG. 2
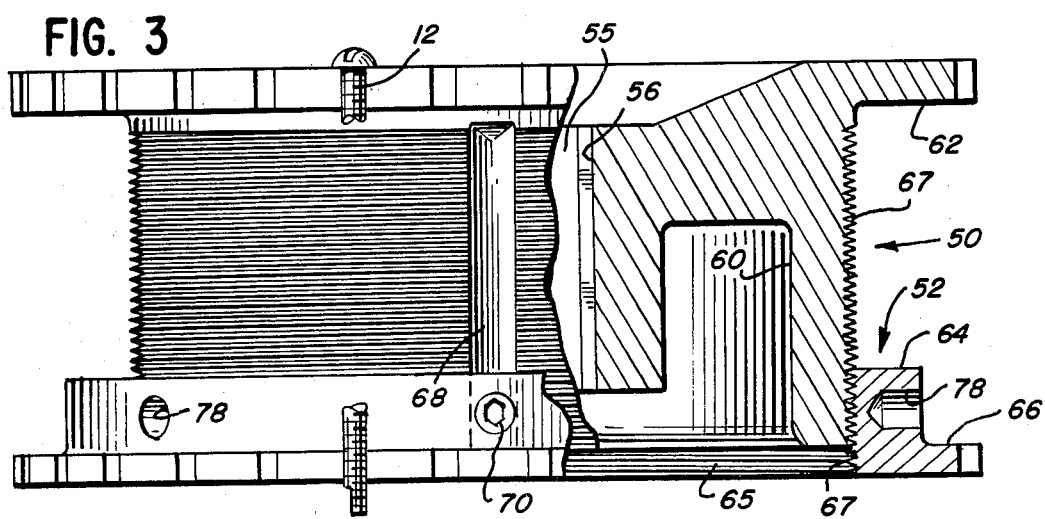
FIG. 3

ADJUSTABLE SHANK SLOT DIAL

BACKGROUND OF INVENTION

A shank slot dial is a cylindrical fixture commonly used in the fabrication of screws, bolts, or other elongate threaded components to render the components self tapping. The slot dial fixture rotates about its longitudinal center axis, and has uniformly spaced notches formed on its outer cylindrical surface that receive and hold the diameter or shank sections of the individual threaded components. The threaded components are snuggly held in the notches by surrounding guide means and by axially biased clamp means acting against the heads of the components. The fabricating machine has powered cutting or grinding means urged against the pointed tip or lead end of the threaded component to slot or groove the end tip.

Because of the large cutting forces, only a small portion of the pointed tip or lead end of the component can be unsupported or cantilevered beyond the supporting fixture. Otherwise, abnormal deflections of the component and possible damage to the component or to the cutting means can take place. Further, the dial notches have to be sized only slightly larger than the diameter or shank sections of the threaded components so that the threaded components can be solidly retained within the notches during the fabrication. For these reasons, it is typical to provide a specific shank slot dial for each size threaded component, including different shank or diameter sizes, and also for different component lengths. The type or pitch of thread on the threaded component generally does not alter the requirements of the shank slot dial.

Because of the large number of conventional screw sizes varying both in diameter and length, considerable capital investment is required for inventorying a separate properly sized dial for each particular size of threaded components to be fabricated. This burdens set up time also in converting from one slot dial to another slot dial between runs of different length threaded components.

FIELD OF SEARCH

This invention concerns itself with slot dial fixture devices found in United States Patent Office Class 10, Subclasses 4, 9, 20.5, 21, 165, and 169; in the United States Patent Office Class 90, Subclass 15.1; and in the United States Patent Office Class 269, Subclass 57. Particular patents believed of possible interest and relating generally to the subject matter of this invention include the following U.S. Pat. Nos. 1,448,832 issued to DeFries; 1,872,564 issued to Stimpson; 1,999,264 issued to Tilton; 2,674,754 issued to Hale, Jr.; 3,085,264 issued to Stern; 3,435,472 issued to Haines; 3,758,900 issued to Morton; and 4,001,906 issued to Betz.

SUMMARY OF INVENTION

This invention discloses an improved shank slot dial that accommodates the ready fixturing of a plurality of like sized threaded components during any single run, and can be adjusted to accommodate threaded components of a different length for subsequent separate runs. A specific object of this invention is to provide an adjustable shank slot dial that can be readily set or adjusted while in place on the slotting machine, without requiring removal of the dial from the machine. The improved shank slot dial of the present invention further can be adjusted to the exact length requirement of any particular run of threaded components to be fabricated, and minimal effort or skill is required to make such adjustment. The improved shank slot dial is also simple in construction and durable in use.

BRIEF DESCRIPTION OF THE DRAWINGS

FIG. 1 is a perspective view illustrating a typical working installation of the improved adjustable shank slot dial relative to a feed rail, slotting cutter, and stripper rod;

FIG. 2 is an elevational view showing the details of the improved shank slot dial in one operative configuration suited for fixturing shorter length threaded components;

FIG. 3 is a view similar to FIG. 2, which shows the shank slot dial rotated 90°, and further illustrates an alternate operative configuration suited for fixturing longer length threaded components; and FIGS. 4 and 5 are fragmentary sectional views as seen generally from lines 4—4 in FIG. 1 and lines 5—5 in FIG. 2, respectively.

DETAILED DESCRIPTION OF THE INVENTION

FIG. 1 illustrates typical slotting apparatus for cutting or grooving the lead or pointed end of a threaded component which thereby renders the component self tapping in operation. The illustrated apparatus includes a cylindrical shank slot dial fixture 10 for receiving and holding a plurality of separate threaded components 12 and for moving these components into working relationship with a slotting cutter 14. The dial fixture 10 has formed on its cylindrical periphery 16 a plurality of uniformly spaced outwardly open notches 18 each of which receives an individual component 12. The components are loaded onto the dial fixture at a feed station by feed rail means 20 which carries the components from a hopper (not shown) in single file and where gravity or a suitable positive feed means (not shown) moves the endmost component against the dial face 16 and into a receiving notch 18. The dial fixture 10 is keyed to shaft 22 which can be indexed incrementally by power means (not shown).

The cutter 14 has two cutting elements 24 keyed to shaft 26 rotatably carried in bearing housing 28 at the end of arm assembly 30. A pulley 32 keyed to the shaft 26 is rotated by an endless belt 33 trained over it and over a drive motor pulley (not shown) to cause the cutting elements 24 to rotate. Further, the arm 30 is supported by appropriate means (not shown) at its lower end to allow for lateral movement of the cutting means 24 toward and away from the fixture and into cutting engagement against the lower end of the individually fixtured threaded components 12.

In order to hold the threaded components 12 in the fixture 10, there is provided guide means comprising a spring 34 located in outward adjacent relationship to the components 12 supported in the dial fixture 10, and axial head clamp means 36 firmly hold the heads of the threaded components 12 in the fixture at the slotting station adjacent the cutting means 24. The illustrated clamp means 36 has a shoe 38 carried on a stem 40 slidably supported by bracket 42. A compression spring 44 is coiled about the stem 40 and biases the shoe 38 into a relatively tight clamping relationship against the threaded component heads. A nut 45 on the stem 40 abuts the bracket 42 to hold the clamp together should the dial fixture be removed and/or the bracket 42 withdrawn from proximity of the dial fixture.

The bracket 42 is normally aligned vertically over the notch locatons 18 on the fixture 10 which correspond to the slotting station so that the notches 18 and the components 12 held therein line up with the cutting elements 24 of the slotter 14. With the two cutting elements 24 illustrated, the dial fixture 10 preferably is indexed two notches each time so as to bring two unoccupied notches into respective alignment with two side-by-side tracks (not shown) on the feed rail means 20 and simultaneously bring two different component loaded notches 18 into alignment with the cutting means 24. The slotted components 12 are automatically stripped or removed from the slot dial fixture 10 by a cantilevered stripping rod 46 having a free or upstream end rearwardly adjacent the components carried in the dial fixture and having a downstream position located outwardly beyond the peripheral dial face 16. A chute or hopper (not shown) located beneath the dial fixture 10 receives the fabricated components 12 as they are stripped from the dial fixture.

Having described the basic operation of the slotting apparatus, the specific structure of the improved slot dial fixture 10 will now be described. The fixture itself is formed by two separate support members 50 and 52. The first support member 50 is formed with a central hub 54 having an internal bore 55 for receiving the dial shaft 22. A keyway opening 56 is located in the hub 54 for receipt of key means 57 to key the first support member 50 relative to the dial shaft 22 as is known in the art. A radial web 58 extends from the central hub 54 and is integral therewith and with a cylindrical wall 60 and a radial flange 62 that projects outwardly beyond the cylindrical wall adjacent one end thereof. The cylindrical wall 60 and the peripheral face of flange 62 are located concentrically of the support hub bore 55 and thereby are concentrically located relative to the dial shaft 22 when supported on the latter.

The second support member 52 is annular in shape having a ring 64 with a bore 65 sized to receive the cylindrical wall of the first member 50 and further having a radial flange 66 which projects radially outwardly beyond the ring 64 and terminates along a peripheral face concentrical of hub bore 65 and equal in diameter to the peripheral face of flange 62. Appropriately mated helical threads 67 are formed on the exterior of the cylindrical wall 60 and on the interior cylindrical surface 65 of ring 64 to allow for threaded connection between the first and second support members 50 and 52. When the support member 52 is threadably supported on the support member 50, the peripheral faces on the flanges 62 and 66 are coaxial and define thereon the circumferential dial face 16 previously noted in general terms concerning the slot dial fixture 10. The component receiving notches 18 are formed in the peripheral faces of the support member flanges.

A pair of axial or longitudinal grooves 68 are formed 180° apart on the outside of the cylindrical wall 60 of the first support member 50 transverse to the threads 67 formed thereon, and a pair of threaded radial set screws 70 are provided 180° apart in the ring section 64 of the second support member 52. When the set screws 70 are drawn up tight and received within the grooves 68, the support members 50 and 52 are keyed nonrotatably relative to one another. With the two grooves 68 and set screws 70, the support members 50 and 52 can be keyed together every half turn or 180°. Thus, if for example the thread means 67 have sixteen threads per inch, the support members 50 and 52 can be secured rigidly together at varying longitudinal or axial spacings every thirtysecondth of an inch while assuring accurate alignment of the notches 18 in the two support members.

Each groove 68 is in the form of a V having two adjacent sloping faces (FIG. 5) meeting generally at a common interior corner so that engagement of the taper nosed or ny-lock type radial set screw 70 accurately locates the two support members 50 and 52 relative to one another. In this manner, the longitudinal or axial alignment of the notches 18 formed on the respective circumferential flanges of the members 50 and 52 can be maintained. Preferably, an equal number of equally spaced notches 18 are milled or formed on the support members 50 and 52, even as the support members are threaded together, and with the center line of one notch being on the center line of one set screw tap. This provides that all corresponding notches 18 of the members 50 and 52 align longitudinally or axially whenever the set screws 70 are engaged in the grooves 68.

The preferred configuration of the notches 68 is illustrated in FIG. 4 where the notch consists of two facing surfaces 74 and two sloping surfaces 76 respectively converging towards one another from the free ends of the facing surfaces 74. The lateral separation of the facing surfaces 74 is approximately equal to or only slightly larger than that across the lateral exterior or diameter of the shank 12 to be supported in the fixture. The sloping surfaces 76 are also located so that the exterior periphery of the positioned threaded component 12 is abutted by the spring band guide means 34 so as to fixture the threaded components 12 accurately and firmly relative to the dial 10.

Preferably, dead end pin holes 78 (see FIG. 3) are formed around the periphery of the ring 64 between the set screws 70, for example at 45° spacings. Such holes permit manual insertion of a pin (not shown) into any of the pin holes in order to provide a mechanical assist in adjustably rotating the support member 52 relative to the support member 50.

The construction of the shank slot dial fixture allows for the ready adjustment of the fixture to suit threaded components of varying length. Adjustment is possible merely by removing the set screws 70 from engagement within the grooves 68 and by rotating the second support member 52 relative to the first support member 50. This can be readily accommodated by insertion of a torque assist pin (not shown) into any pin receiving hole 78 as previously mentioned. When the proper spacing between the separate flanges 62 and 66 of the support members is achieved in accordance with the length of the specific threaded components 12 to be fabricated, the set screws 70 are again drawn tightly into the receiving grooves 68 automatically lining up the notches 18 of the members 50 and 52 axially or longitudinally relative to one another. During any adjustment of the second support member 52 relative to the first support member 50, the adjustment can be made while the shank slot dial fixture 10 is secured relative to the shaft 22.

The aligned notches 18 in the separate support members 50 and 52 receive the threaded components 12, the opposite ends of each threaded component abutting the support members, and the intermediate sections of the threaded members bridging the spacing between the support members. The pointed or lead end of each threaded component 12 can be made to protrude below the flange 66 on the support member 52 the exact distance required in order to allow a clean cut from the cutting means 24 without the latter engaging and damaging the support member.

Since the dial fixture 10 is formed of two main support members 50 and 52, it is possible to fabricate the support member 52 of softer material than the material used for support member 50. Thus, should the cutting means 24 accidentally engage the second member 52, replacement of a damaged second support member 52 is more readily and economically possible than would replacement of the entire fixture as is necessary when a conventional shank slot dial is damaged by the cutter means.

The fixture 10 can be taken apart and reassembled in order to accommodate excessively long shank or threaded components, as is illustrated in FIG. 3. In this configuration, the support member 52 is reversed to position the flange 66 on the remote end of the ring 64 relative to the flange 62 on the support member 50. This further increases the spacing between the notched circumferential faces 62 and 66 of the support members against which the threaded components 12 are held during a slotting operation.

I claim:

1. An adjustable shank slot dial for fixturing elongate shanks, said dial being manually adjustable to accommodate shanks of different lengths and comprising the combination of first and second shank support members, said members having equi-diameter cylindrical faces each having formed therein a plurality of circumferentially spaced axial notches sized to receive said shanks snugly across the diameters thereof, means for supporting said first shank support member for rotation about the longitudinal center axis of its cylindrical face, and means for adjustably mounting and rigidly securing said second support member onto said first support member with said circumferential faces coaxially disposed and at adjustable axial spacings with corresponding notches in the respective cylindrical faces axially aligned with one another whereby opposite end sections of the shanks are adapted to be abutted against and supported by the dial circumferential faces and the intermediate sections of the shanks are adapted to bridge the axial spacing between said circumferential faces, said mounting and securing means including complementary sets of helical threads formed on said first and second shank support members located coaxially around the longitudinal center axis so that rotation of the second member relative to the first member effects axial movement of the second member relative to the first member to adjust the distance between said cylindrical faces to receive and support shanks of different lengths.

2. An adjustable shank slot dial according to claim 1, wherein the mounting and securing means further includes set screw means carried on the second support member operable to be tightened down to engage the first support member and nonrotatably key the second support member relative to the first support member to hold said members in the adjusted position.

3. An adjustable shank slot dial according to claim 2, wherein the mounting and securing means further includes axial groove means formed along the first support member at a location to receive said set screw means only when the second support member is rotated to a position where the notches thereon are axially aligned with the notches on the first member operable thereby to nonrotatably hold said members in said aligned position.

4. An adjustable shank slot dial according to claim 1, wherein the first support member has a cylindrical exterior surface of smaller diameter than its cylindrical face, the second support member is annular in configuration and includes a ring member with a cylindrical bore surface sized to fit over said cylindrical surface of said first support means, and wherein said mounting and securing means includes helical threads formed on said cylindrical surfaces adapted to threadably support said second support member relative to said first support member.

5. An adjustable shank slot dial according to claim 4, wherein said second support member further has flange projecting radially of said ring member at one axial end thereof, the circumferential face of said second member being located on the periphery of said flange, whereby said second support member can be threaded onto said first support member in either of two alternate positions where said flange end of the ring member is located in proximity to the circumferential face of the first support member or where the opposite end of said ring member remotely of said flange is located in proximity to the circumferential face of said first support member.

6. An adjustable shank slot dial according to either claim 4 or 5, wherein said second support ring member further has provided thereon at least one radially disposed hole suited to receive and securely hold a pin manually inserted therein to serve as a mechanical assist to rotate said second support member adjustably relative to said first support member.

7. An adjustable shank slot dial according to either claim 4 or 5 wherein said first and second support members are made of different materials, and said second support member is made of the softer of the two materials.

* * * * *